United States Patent
Mitani et al.

(10) Patent No.: US 10,324,296 B2
(45) Date of Patent: Jun. 18, 2019

(54) DISPLAY DEVICE

(71) Applicant: Panasonic Intellectual Property Management Co., Ltd., Osaka (JP)

(72) Inventors: Hiroshi Mitani, Osaka (JP); Katsuo Saigou, Hyogo (JP); Kenya Uomori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/872,258

(22) Filed: Jan. 16, 2018

(65) Prior Publication Data

US 2018/0217381 A1 Aug. 2, 2018

(30) Foreign Application Priority Data

Feb. 2, 2017 (JP) ................. 2017-017863

(51) Int. Cl.
 *G02B 27/01* (2006.01)
(52) U.S. Cl.
 CPC ..... *G02B 27/0176* (2013.01); *G02B 27/0172* (2013.01); *G02B 2027/013* (2013.01); *G02B 2027/0154* (2013.01)
(58) Field of Classification Search
 CPC .. G02B 27/011; G02B 27/013; G02B 27/017; G02B 27/0101; G02B 27/0149; G02B 27/0172; G02B 27/0176; G02B 27/0179; G02B 2027/013; G02B 2027/0112; G02B 2027/0149
 See application file for complete search history.

(56) References Cited

U.S. PATENT DOCUMENTS

| | | |
|---|---|---|
| 5,594,588 A | 1/1997 | Togino |
| 5,793,339 A | 8/1998 | Takahashi |
| 2002/0041445 A1 | 4/2002 | Nishioka et al. |
| 2004/0070843 A1 | 4/2004 | Nishioka et al. |
| 2005/0190456 A1 | 9/2005 | Nishioka et al. |

(Continued)

FOREIGN PATENT DOCUMENTS

| | | |
|---|---|---|
| JP | 5-303054 | 11/1993 |
| JP | 5-303056 | 11/1993 |

(Continued)

*Primary Examiner* — Sultan Chowdhury
(74) *Attorney, Agent, or Firm* — Wenderoth, Lind & Ponack, L.L.P.

(57) ABSTRACT

A display device displays video for a virtual image. The display device includes a video generation unit generates image light representing the video, a concave mirror has a reflective surface on which the image light is reflected, and a support mechanism adjusts a position of the concave mirror. The concave mirror has, in each position on the reflective surface, a first radius of curvature in the first direction and a second radius of curvature in a second direction. The first radius of curvature and the second radius of curvature individually change and have different rates of change. The reflective surface has a shape following a partial region on an outer surface of an ellipsoid. The ellipsoid has a radius along the first direction that is greater than a radius along the second direction and a radius along a third direction orthogonal to the first direction and the second direction.

9 Claims, 9 Drawing Sheets

(56) References Cited

U.S. PATENT DOCUMENTS

2010/0066984 A1\* 3/2010 Horiuchi ................ B60K 35/00
  353/97
2017/0045738 A1\* 2/2017 Kim ......................... G02B 5/30

FOREIGN PATENT DOCUMENTS

| JP | 7-234376 | 9/1995 |
| JP | 2002-122784 | 4/2002 |

\* cited by examiner

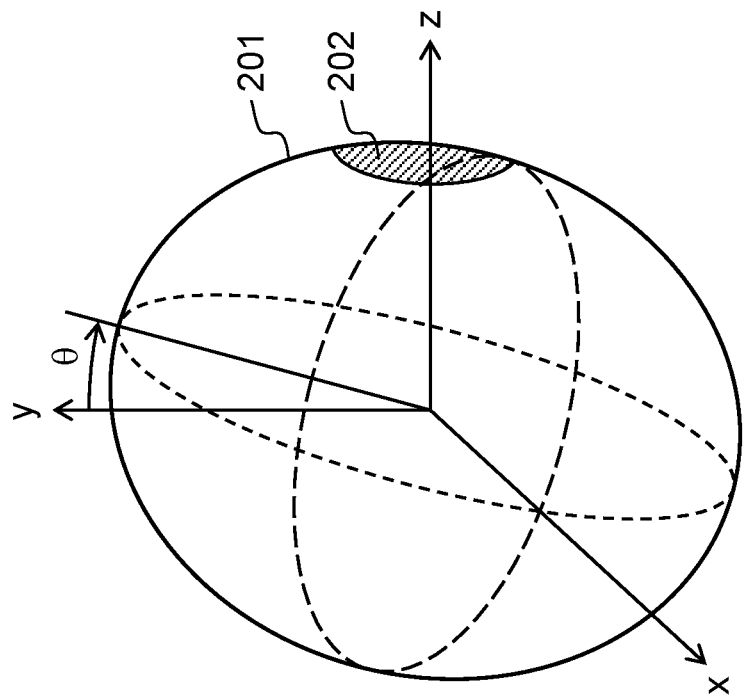
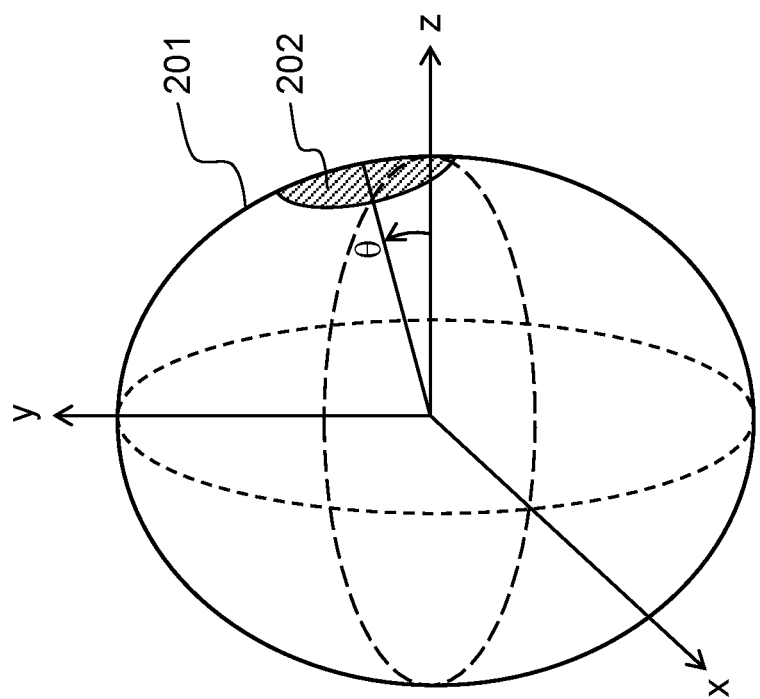

DISPLAY DEVICE

BACKGROUND

1. Technical Field

The present disclosure relates to a display device which is worn, for example, on the user's head when in use.

2. Description of the Related Art

Patent Literature (PTL) 1 discloses a portable visual display device which is worn on the user's head. The visual display device disclosed in PTL 1 includes: a two-dimensional display element that displays video; a concave mirror that enlarges the video displayed by the two-dimensional display element and projects the video into the air as a virtual image; and a support means that supports the concave mirror in the immediate front of the user's eyeball. According to PTL 1, in order to enable a user of the visual display device to observe the virtual image with a wide angle of view, the concave mirror having a specific curvature is used.

CITATION LIST

Patent Literature

PTL 1: Unexamined Japanese Patent Publication No. 1105-303054

SUMMARY

The present disclosure relates to a display device which allows a user to visually recognize a virtual image and can facilitate adjustment of the distance at which the virtual image can be visually recognized.

A display device according to the present disclosure displays video for allowing a virtual image to be visually recognized. The display device includes a video generation unit, a concave mirror, and a support mechanism. The video generation unit generates image light representing the video. The concave mirror has a reflective surface on which the image light incoming from the video generation unit is reflected. The support mechanism supports the video generation unit and the concave mirror in a manner as to adjust a position of the concave mirror in a first direction intersecting the direction of a normal to the reflective surface. The concave mirror has, in each position on the reflective surface, a first radius of curvature in the first direction and a second radius of curvature in a second direction orthogonal to the first direction. The first radius of curvature and the second radius of curvature individually change according to a position on the reflective surface in the first direction and have different rates of change. The reflective surface of the concave mirror has a shape following a partial region on an outer surface of an ellipsoid. The ellipsoid has a radius along the first direction that is greater than a radius along the second direction and a radius along a third direction orthogonal to the first direction and the second direction.

According to the present disclosure, in a display device which allows a user to visually recognize a virtual image, it is possible to facilitate adjustment of the distance at which the virtual image can be visually recognized.

BRIEF DESCRIPTION OF THE DRAWINGS

FIG. 4A and FIG. 4B illustrate the relationship between an ellipsoid and a reflective surface of a concave mirror according to the first exemplary embodiment;

DETAILED DESCRIPTION

Hereinafter, exemplary embodiments will be described in detail with reference to the drawings as necessary. However, there are instances where overly detailed description is omitted. For example, detailed description of well-known matter, overlapping description of substantially identical elements, etc., may be omitted. This is to prevent the subsequent description from becoming unnecessarily redundant, and thus facilitate understanding by a person having ordinary skill in the art.

Note that the accompanying drawings and the subsequent description are provided so that a person having ordinary skill in the art is able to sufficiently understand the present disclosure, and are not intended to limit the scope of the subject matter recited in the claims.

First Exemplary Embodiment

Hereinafter, the first exemplary embodiment will be described with reference to FIGS. 1 to 9.

1. Configuration

Figure 1:
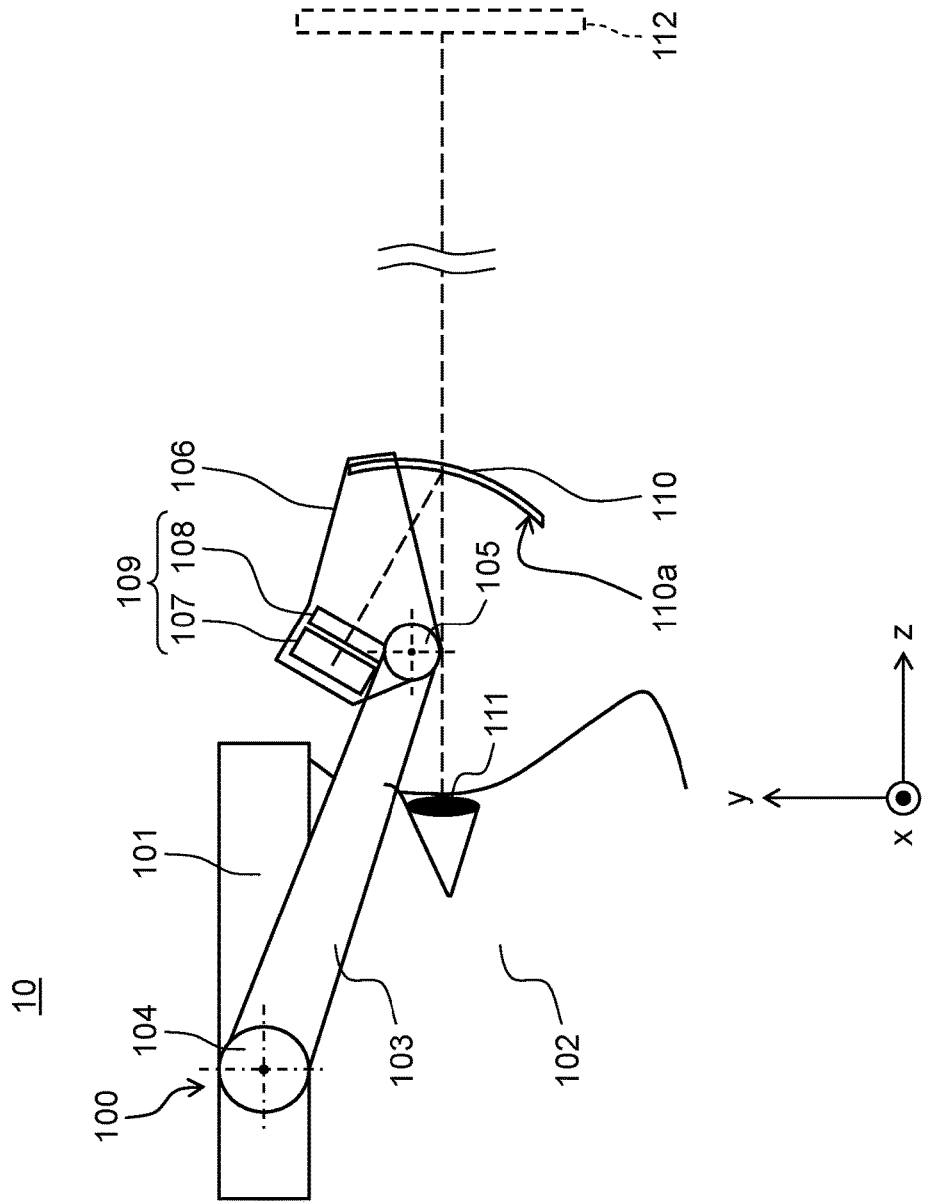
FIG. 1 is a schematic view illustrating a display device according to the first exemplary embodiment.
Figure 2:
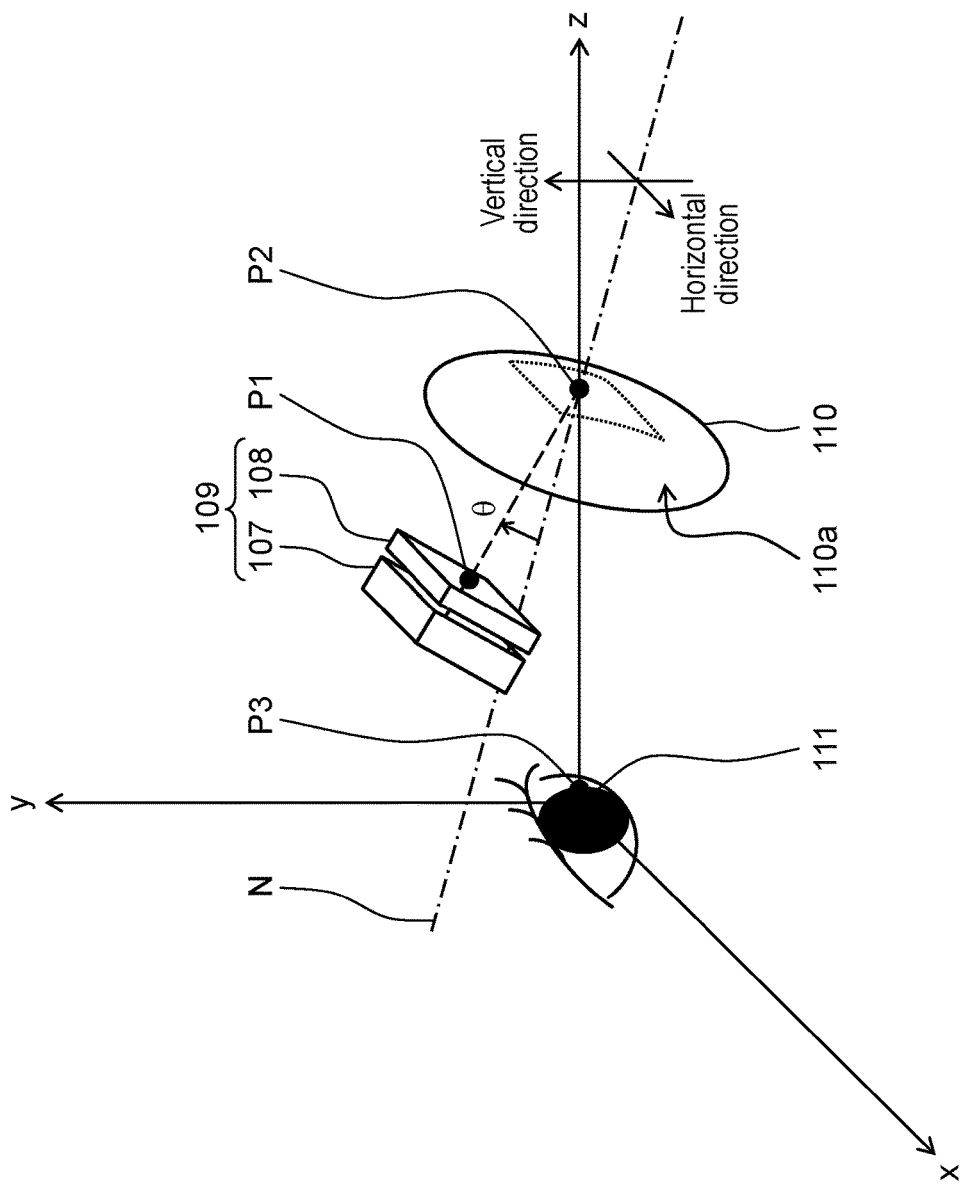
FIG. 2 illustrates the state in which a display device according to the first exemplary embodiment is worn.

The configuration of a display device according to the present exemplary embodiment will be described with reference to FIGS. 1 and 2. FIG. 1 is a schematic view illustrating display device 10 according to the first exemplary embodiment. FIG. 2 illustrates the state in which display device 10 is worn.

As illustrated in FIG. 1, display device 10 according to the present exemplary embodiment includes support mechanism 100, micro-display 109, and concave mirror 110. Display device 10 is a head-mounted display (HMD) which is worn on the head of user 102 when in use.

FIG. 2 illustrates the positional relationship of pupil 111 of user 102 wearing display device 10 with respect to micro-display 109 and concave mirror 110. User 102 can visually recognize, across concave mirror 110, virtual image 112 (refer to FIG. 1) based on image light generated by micro-display 109, by looking through concave mirror 110 with one eye pupil 111.

Hereinafter, the line of sight of user 102 is defined as the z-axis direction, the vertical direction orthogonal to the z-axis direction of the line of sight is defined as the y-axis direction (longitudinal direction), and the horizontal direction orthogonal to the z-axis direction and the y-axis direction is defined as the x-axis direction (lateral direction). There are cases where the positive side and the negative side in the y-axis direction are referred to as upward and downward, respectively.

Returning to FIG. 1, support mechanism 100 supports concave mirror 110 and micro-display 109 in such a manner that user 102 can adjust the position and the orientation of concave mirror 110. As illustrated in FIG. 1, support mechanism 100 includes head band 101, arm 103, first and second pivots 104 and 105, and case 106.

As illustrated in FIG. 1, head band 101 is fitted so as to encompass the perimeter of the head of user 102. Display device 10 is fixed to the head of user 102 by head band 101.

Arm 103 has first pivot 104 at one end and second pivot 105 at the other end. Arm 103 is attached to a side surface of head band 101 via first pivot 104 when viewed from user 102.

First pivot 104 can rotate arm 103 relative to head band 101 about a rotation axis in the x-axis direction by applying force greater than or equal to predetermined friction force. In the state where the above force is not applied, first pivot 104 maintains the angle of rotation of arm 103 relative to head band 101 according to friction force.

Second pivot 105 connects arm 103 and case 106. Similar to first pivot 104, second pivot 105 can rotate case 106 relative to arm 103 about a rotation axis in the x-axis direction by applying force. In the state where the force is not applied, second pivot 105 maintains the angle of rotation of case 106 relative to arm 103 according to fiction force.

Case 106 houses micro-display 109 and concave mirror 110. In case 106, backlight 107 and liquid-crystal panel 108 which constitute micro-display 109 and concave mirror 110 are mounted so as to keep the relationship of relative positions thereof constant. The positional relationship between micro-display 109 and concave mirror 110 will be described later.

Micro-display 109 is, for example, a transmissive liquid-crystal device, and includes backlight 107 and liquid-crystal panel 108. Micro-display 109 is, for example, connected to an external video signal source (not illustrated in the drawings). Micro-display 109 is an example of a video generation unit that generates image light representing video for allowing virtual image 112 to be visually recognized on the basis of video signals input from the outside.

Backlight 107 includes, for example, a light source element such as a light-emitting diode (LED) light source. Backlight 107 emits illuminating light for illuminating liquid-crystal panel 108 in micro-display 109.

Liquid-crystal panel 108 changes the transmittance of liquid crystals in each pixel on the basis of video signals from the external video signal source so as to represent a degree of shading in video, and spatially modulates the illuminating light from backlight 107 into image light. Thus, micro-display 109 displays, on liquid-crystal panel 108, video based on the image light.

The video displayed by micro-display 109 is for allowing user 102 to visually recognize virtual image 112 through concave mirror 110. Since virtual image 112 is a mirror image, micro-display 109 displays already left-right (along the x-axis direction) reversed video so that user 102 can visually recognize properly oriented virtual image 112. The image light corresponding to the video displayed on micro-display 109 is emitted to concave mirror 110 in case 106.

Concave mirror 110 includes reflective surface 110a that has a specific curved shape and reflective properties. Concave mirror 110 has, in each position on reflective surface 110a, shape-dependent radii of curvature in the longitudinal direction (y-axis direction) and the lateral direction (x-axis direction). The shape of reflective surface 110a of concave mirror 110 will be described later. Reflective surface 110a may either be an inner surface or an outer surface of concave mirror 110. Furthermore, reflective surface 110a may be formed inside concave mirror 110.

The reflective properties of concave mirror 110 are optical properties that cause total reflection or semi-transmission of illuminating light (image light), for example. The optical properties for semi-transmission may be flat spectral characteristics or may be spectral characteristics in which light having a specific wavelength is selectively reflected or transmitted.

Concave mirror 110 reflects, on reflective surface 110a, the image light traveling from micro-display 109, toward pupil 111 of user 102. As a result of a function of concave mirror 110, virtual image 112 that is an enlarged image of the video, which is a real image, displayed on micro-display 109 is formed at an imaging distance at which the image can be observed from user 102.

Display device 10 according to the present exemplary embodiment uses support mechanism 100 to adjust the position of concave mirror 110, thus enabling adjustment of the imaging distance of virtual image 112.

Generally, with a head-mounted display (HMD), the imaging distance of an easy-to-view virtual image is different depending on user's eyesight and the distance to an object to be dealt with by a task performed using the HMD. For example, there are cases where a farsighted user cannot focus on the virtual image if the distance thereto is too short. On the other hand, a user working on a desk might feel a sense of discomfort if the distance to the virtual image is so long that the virtual image is observed farther away than the task object. Therefore, the ability to adjust the imaging distance of the virtual image (diopter adjustment) is strongly desired as a function of HMDs.

Possible configuration examples of the diopter adjustment function of HMDs include a configuration in which a display device including a micro-display and a concave mirror, for example, is provided with a mechanism dedicated to diopter adjustment that makes the distance between the micro-display and the concave mirror variable. In such a configuration, upon changing the distance between the micro-display and the concave mirror, unnecessary movement such as inclination and axial displacement in the relative positional relationship therebetween may lead to aberration in a virtual image which a user observes, creating a situation where there is a difficulty in reading the displayed image.

In order to avoid the abovementioned situation, it is possible to provide a robust guiding mechanism that allows a precise change in the distance between the micro-display and the concave mirror. However, such a large and elaborate mechanism causes the device configuration to increase in size and weight. Since the HMD is worn on a user' body, the increase in the size of the device configuration decreases its usability and the increase in the weight of the device configuration increases the likelihood of user fatigue. Therefore, the ability to adjust the imaging distance of the virtual image is often left out even though it is strongly desired as a function of HMDs.

In contrast, display device 10 according to the present exemplary embodiment allows diopter adjustment without using such a large and elaborate mechanism that makes the distance between micro-display 109 and concave mirror 110 variable as mentioned above. Display device 10 uses various parts (arm 103, first and second pivots 104 and 105, etc.) of support mechanism 100 for moving, with the aim of diopter adjustment, micro-display 109 and concave mirror 110 to a position (standard position) inherently appropriate for user 102, and maintaining the positional relationship therebetween. The method for diopter adjustment in display device 10 will be described later.

1-1. Positional Relationship in Standard Position

The positional relationship between micro-display 109 and concave mirror 110 in the standard position of display device 10 according to the present exemplary embodiment will be described with reference to FIG. 2.

Display device 10 according to the present exemplary embodiment can be designed so that virtual image 112 can be visually recognized at a predetermined distance across reflective surface 110a when the position, on reflective surface 110a, of the line of sight of user 102 looking through concave mirror 110 is a specific standard position. Such designing includes selecting light emission point P1 on micro-display 109 and reflection point P2 on concave mirror 110, as illustrated in FIG. 2, for example.

Light emission point P1 is a standard pixel point from which the image light corresponding to a specific pixel (for example, the pixel at the center) in the video displayed on micro-display 109 is emitted. Reflection point P2 defines, on reflective surface 110a, a reflection position where the image light traveling from light emission point P1 is reflected in a reflection region in the standard position, and is, for example, the center point of the reflection region in the standard position.

For example, at the time of designing, the orientation of each of micro-display 109 and concave mirror 110 is set in consideration of incidence angle θ of image light when the image light travels from light emission point P1 on micro-display 109, is reflected at reflection point P2, and reaches point P3 on pupil 111. Incidence angle θ between light emission point P1 and reflection point P2 is defined as an angle between an optical path from light emission point P1 to reflection point P2 and normal N to reflection point P2 on reflective surface 110a.

Incidence angle θ is in the range of to 90 degrees, inclusive. When incidence angle θ between light emission point P1 and reflection point P2 is used as a reference for designing, incidence angle θ as a reference for designing may be set in a narrower range. For example, if incidence angle θ is small, a part of virtual image 112 appearing on concave mirror 110 becomes invisible under the shadow of micro-display 109. If incidence angle θ is large, the longitudinal dimension of virtual image 112 across concave mirror 110 is reduced. From such a perspective, incidence angle θ as a reference for designing is set to be small in the range of angles greater than or equal to the angle at which a part of virtual image 112 becomes invisible in accordance with the dimension of micro-display 109, for example.

Furthermore, in order to set the imaging distance of virtual image 112 to a desired design value, for example, the distance between micro-display 109 and concave mirror 110 is set on the basis of the optical path length between light emission point P1 and reflection point P2, the radius of curvature at reflection point P2, and the like (refer to equation (3)).

The above relative positional relationship between micro-display 109 and concave mirror 110, such as the orientation thereof and the distance therebetween, is maintained by case 106 of support mechanism 100 (refer to FIG. 1) according to the present exemplary embodiment. Thus, user 102 can observe virtual image 112 at the imaging distance having the design value by adjusting various parts of support mechanism 100.

1-2. Reflective Surface of Concave Mirror

In display device 10 according to the present exemplary embodiment, the shape of reflective surface 110a of concave mirror 110 is set by adjusting the imaging distance during the use of display device 10 so that easy-to-view virtual image 112 can be obtained. In the present exemplary embodiment, reflective surface 110a is formed on the basis of a solid figure. Reflective surface 110a based on a solid figure will be described with reference to FIGS. 3 and 4.

Figure 3:
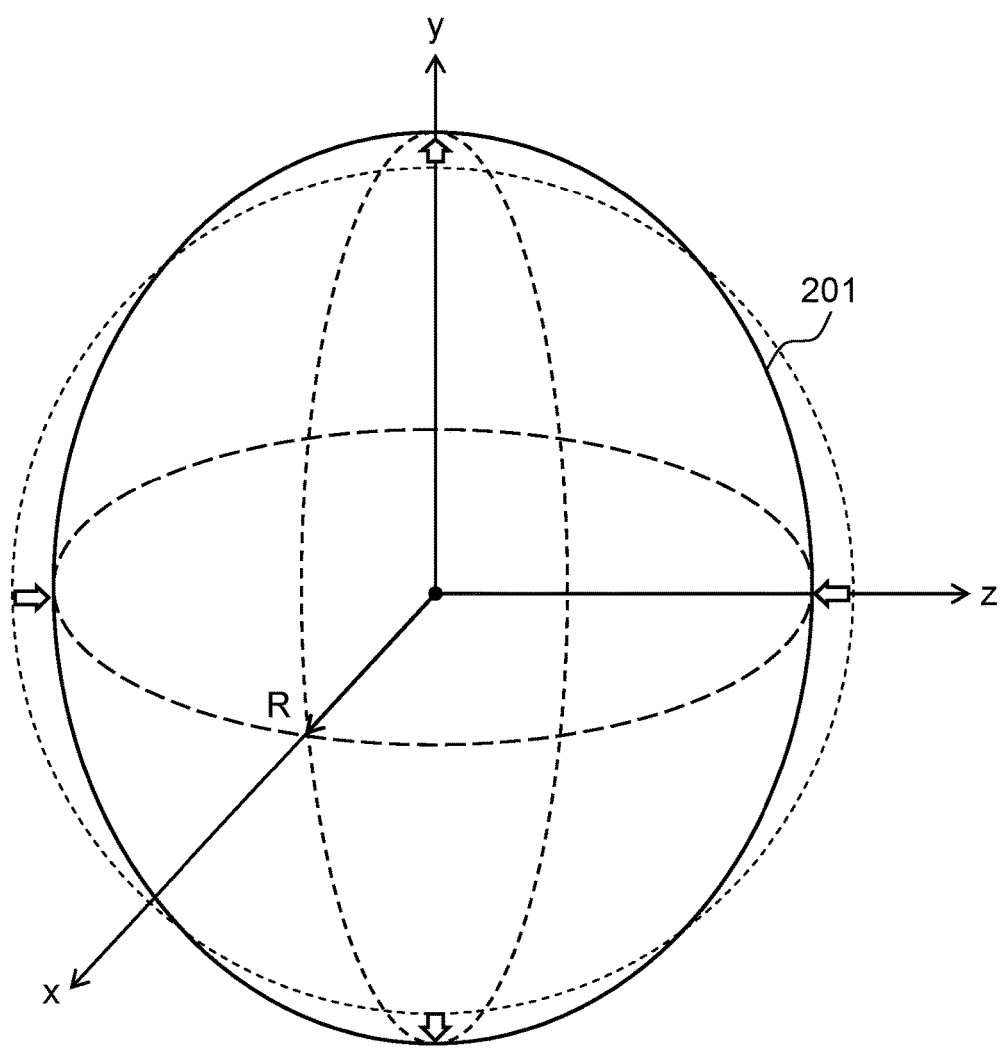
FIG. 3 is a perspective view illustrating an ellipsoid for configuring a concave mirror of a display device according to the first exemplary embodiment.

FIG. 3 is a perspective view illustrating ellipsoid 201 for configuring concave mirror 110 according to the present exemplary embodiment. In the present exemplary embodiment, reflective surface 110a of concave mirror 110 is set to have a shape following a partial region on the outer surface of ellipsoid 201 which is a solid figure elongated from a true sphere having radius R in the y-axis direction, as illustrated in FIG. 3. Ellipsoid 201 has a y-axis radius greater than an x-axis radius and a z-axis radius and has an elliptical cross-section in the y-axis direction (along the y-axis). In addition to the elongation in the y-axis direction, compression in the z-axis direction from the true sphere having radius R may be included in formation of ellipsoid 201. Ellipsoid 201 is represented by a quadric surface, for example, according to equation (1) below using x, y, and z as coordinates in the orthogonal coordinate system.

$$x^2 + ay^2 + bz^2 = R^2 \tag{1}$$

In the above equation (1), coefficient "a" is a parameter set to be between 0 and 1, coefficient "b" is a parameter set to be between 1 and 1/a, inclusive, and x-axis radius R is appropriately set as a parameter of θ or more.

Coefficient "a" in the above equation (1) is, for example, set according to equation (2) below using the above-described incidence angle θ between light emission point P1 and reflection point P2 (refer to FIG. 2).

$$a = 1 - (\sin \theta)^2 / \cos \theta \tag{2}$$

When reflective surface 110a with coefficient "a" that satisfies the above equation (2) is used, the virtual image based on the image light that is reflected near reflection point P2 can be made easier to view. Note that angle θ that satisfies the relationship of the above equation (2) about coefficient "a" is not limited to incidence angle θ between light emission point P1 and reflection point P2 and may be any incidence angle that can be formed between micro-display 109 and concave mirror 110.

FIG. 4A and FIG. 4B illustrate the relationship between ellipsoid 201 and reflective surface 110a of concave mirror 110. The shape of reflective surface 110a of concave mirror 110 is set to the shape of extracted region 202 which is an extracted part of the outer surface of ellipsoid 201, as illustrated in FIG. 4A. Extracted region 202 is a region in a predetermined range including a position located upward of a vicinity of the z-axis of ellipsoid 201 by predetermined degrees of latitude in the y-axis direction where the latitude is based on the assumption that the xz plane is an equatorial plane. The predetermined degrees of latitude are, for example, set to incidence angle θ between light emission point P1 and reflection point P2 (refer to FIG. 2).

Extracted region 202 illustrated in FIG. 4A can be obtained by extracting a predetermined range around a point of intersection between the z-axis and ellipsoid 201 rotated through incidence angle θ about the x-axis, as illustrated in FIG. 4B.

Note that angle θ for obtaining extracted region 202 does not always need to correspond to incidence angle θ between light emission point P1 and reflection point P2 and does not always need to match angle θ that satisfies the relationship of equation (2) about coefficient "a".

Concave mirror 110 having reflective surface 110a corresponding to extracted region 202 is fixed to case 106 so that the x-axis direction of ellipsoid 201 corresponds to the rotation axis of each of pivots 104 and 105 of support mechanism 100 (refer to FIG. 1). In other words, the center of reflective surface 110a (extracted region 202) is set in a position arrived at by moving in the yz plane of the coordinate system in FIG. 4A and rotating about the x-axis without rotating the y-axis and the z-axis so that the image light from micro-display 109 is reflected toward pupil 111 of user 102.

2. Operations

Operations of display device 10 according to the present exemplary embodiment configured as described above will be described below.

2-1. Method for adjusting Imaging Distance of Virtual Image

Figure 5:
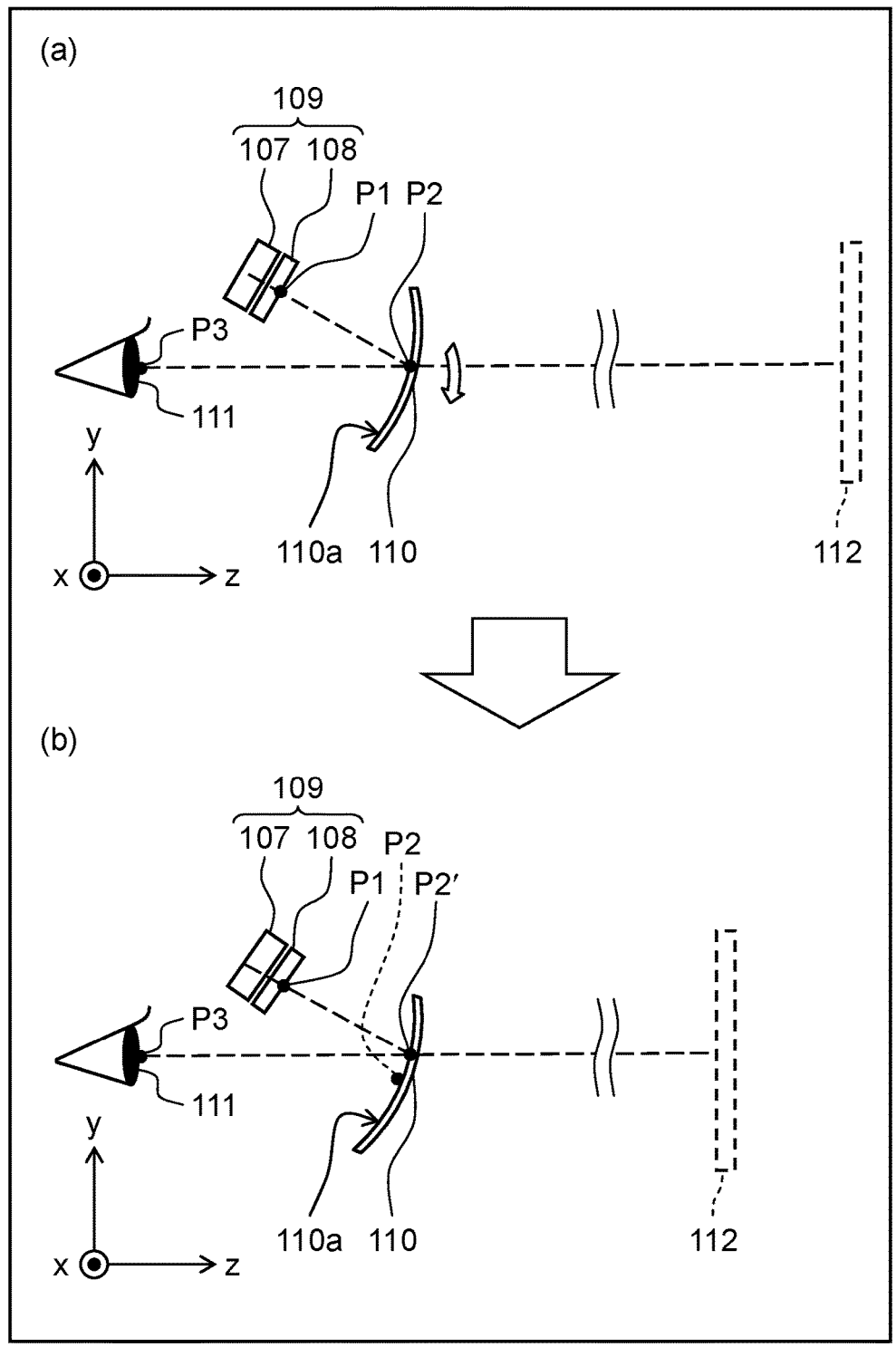
FIG. 5 illustrates an adjustment method for a display device to bring a virtual image close.
Figure 6:
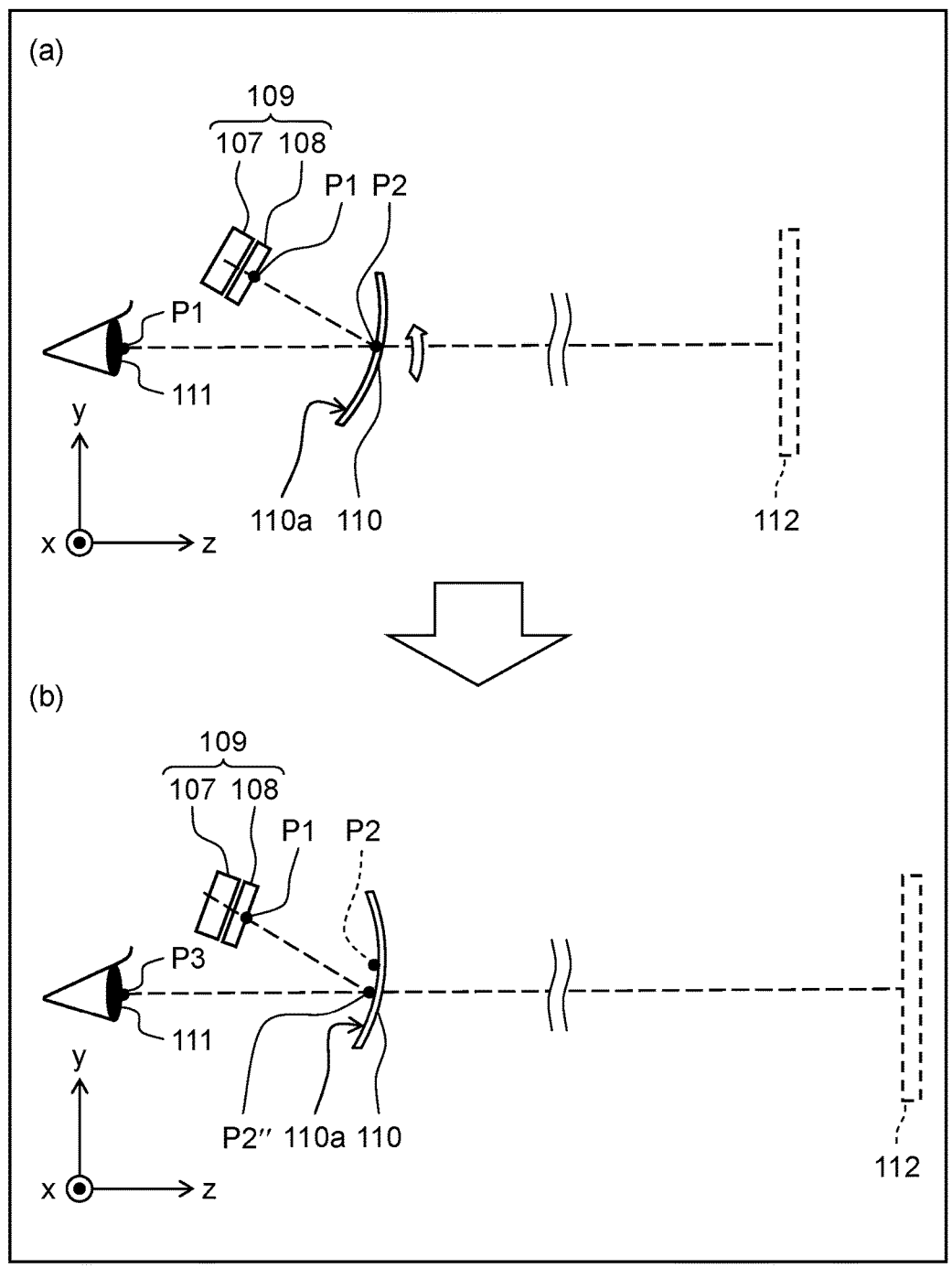
FIG. 6 illustrates an adjustment method for a display device to move a virtual image away.

First, a method for adjusting the imaging distance of virtual image 112 by display device 10 according to the present exemplary embodiment, that is, a method for diopter adjustment will be described with reference to FIGS. 5 and 6. FIG. 5 illustrates an adjustment method for display device 10 to bring virtual image 112 close. FIG. 6 illustrates an adjustment method for display device 10 to move virtual image 112 away.

FIG. 5 illustrates, in (a), an example of an optical path of image light incident on pupil 111 of user in a state where the reflection region in the standard position is set in display device 10. User 102 can adjust the angle of rotation of each of pivots 104 and 105 by holding arm 103, case 106, etc., of support mechanism 100 (refer to FIG. 1) and moving it up and down with appropriate force to set the positional relationship illustrated in (a) in FIG. 5.

In positional relationship (a) illustrated in FIG. 5, micro-display 109 is disposed above the line of sight of user 102 when viewed in the y-axis direction. Concave mirror 110 is disposed in a position where the line of sight of user 102, that is, a z-axis line extended from point P3 on pupil 111, passes through reflection point P2, and is oriented in a direction in which reflected image light traveling from light emission point P1 on micro-display 109 and reflected off reflection point P2 is output along the z-axis direction.

In display device 10, micro-display 109 emits image light to concave mirror 110 located opposite thereto in case 106. On the basis of reflected image light from concave mirror 110, display device 10 generates virtual image 112 which is an enlarged, reversed image of video displayed on micro-display 109. Virtual image 112 is formed in an imaging position on the opposite side of concave mirror 110 from micro-display 109 according to equation (3) below.

$$1/A - 1/B = 1/F \qquad (3)$$

In the above equation (3), focal length F is the focal length of concave mirror 110 and is generally ½ times the radius of curvature of concave mirror 110. First optical distance A is the optical distance between the video on micro-display 109 and reflective surface 110a of concave mirror 110, and second optical distance B is the optical distance between reflective surface 110a and the imaging position of virtual image 112.

For example, in positional relationship (a) in the yz plane illustrated in FIG. 5, focal length F is ½ times the radius of curvature in the longitudinal direction (y-axis direction) at reflection point P2. First optical distance A corresponds to the optical path length between light emission point P1 and reflection point P2, and second optical distance B corresponds to the imaging distance between reflection point P2 and the imaging position of virtual image 112.

When the image light traveling from light emission point P1 is reflected at reflection point P2 on concave mirror 110, the reflected light is output along the z-axis direction and reaches point P3 on pupil 111 of user 102. Thus, user 102 can observe virtual image 112 formed at the designed imaging distance.

FIG. 5 illustrates, in (a) and (b), the states before and after the adjustment to bring virtual image 112 close. The adjustment to bring virtual image 112 close is performed by shifting concave mirror 110 downward in the longitudinal direction (y-axis direction), for example, from positional relationship (a) illustrated in FIG. 5. For example, user 102 can make adjustments into positional relationship (b) illustrated in FIG. 5 by moving case 106 downward or rotating case 106 clockwise about second pivot 105 in FIG. 5 (refer to FIG. 1).

According to the adjustments described above, reflection point P2' through which the line of sight (z-axis) of user 102 passes on reflective surface 110a of concave mirror 110 moves to a relative position above reflection point P2 which is a reflection point before the adjustments when viewed in the y-axis direction. Accordingly, the incidence angle of the image light from light emission point P1 on micro-display 109 to reflection point P2' is smaller than the incidence angle of such image light traveling to reflection point P2 before the adjustments. Furthermore, the optical path length between light emission point P1 and reflection point P2' is shorter than the optical path length between light emission point P1 and reflection point P2 before the adjustments.

The optical path length between light emission point P1 and light reflection point P2' corresponds to first optical distance A in equation (3). Therefore, a reduction in the optical path length to reflection point P2' causes a reduction in the imaging distance of virtual image 112. Thus, user 102 can make the diopter adjustment to bring close virtual image 112 which user 102 visually recognizes.

FIG. 6 illustrates, in (a) and (b), the states before and after the adjustment to move virtual image 112 away. The adjustment to move virtual image 112 away is performed by shifting concave mirror 110 upward in the longitudinal direction (y-axis direction), for example, from positional relationship (a) illustrated in FIG. 6. For example, user 102 can make adjustments into positional relationship (b) illustrated in FIG. 6 by moving case 106 upward or rotating case 106 counterclockwise about second pivot 105 in FIG. 6 (refer to FIG. 1).

According to the adjustments described above, reflection point P2" through which the line of sight of user 102 passes on reflective surface 110a of concave mirror 110 moves to a relative position below reflection point P2 which is a reflection point before the adjustments when viewed in the y-axis direction. Accordingly, the incidence angle of the image light from light emission point P1 on micro-display 109 to reflection point P2" is greater than the incidence angle of such image light traveling to reflection point P2 before the adjustments.

Furthermore, the optical path length between light emission point P1 and reflection point P2" is longer than the optical path length between light emission point P1 and reflection point P2 before the adjustments.

In this case, according to equation (3), an increase in the optical path length to reflection point P2″ causes an increase in the imaging distance of virtual image 112. Thus, user 102 can make the diopter adjustment to move away virtual image 112 which user 102 visually recognizes.

As described above, with display device 10 according to the present exemplary embodiment, user 102 can move the reflection region on concave mirror 110 by adjusting various parts of support mechanism 100 while the relative positional relationship between micro-display 109 and concave mirror 110 is maintained constant. Thus, it is possible to adjust the imaging distance of virtual image 112, that is, make the diopter adjustment, by changing the distance between the light emission point on micro-display 109 and the reflection point on concave mirror 110.

As an example, suppose that coefficient "a"=0.931, coefficient "b"=1.0263, and radius R=55 are set in equation (1), the distance between micro-display 109 and concave mirror 110 is 28 mm, and incidence angle θ is 15 degrees, user 102 can observe virtual image 112 at a distance of 1,000 mm across reflective surface 110a. In this case, when the reflection region is moved 5 mm upward on reflective surface 110a of concave mirror 110, the distance to virtual image 112 can be shortened to 500 mm. In this way, the diopter adjustment can be made in such a manner that upward movement of the reflection region shortens the distance to the virtual image while downward movement of the reflection region increases the distance to the virtual image.

2-2. Findings about Diopter Adjustment for Virtual Image

The inventor of the present invention diligently examined the diopter adjustment described above. As a result, the inventor of the present invention found that the movement of the reflection region brings about a situation like astigmatism as a vision condition and makes clear visual recognition of virtual image 112 difficult, and conceived an idea for solving this difficulty. The findings by the inventor of the present invention will be described with reference to FIG. 7.

Figure 7:
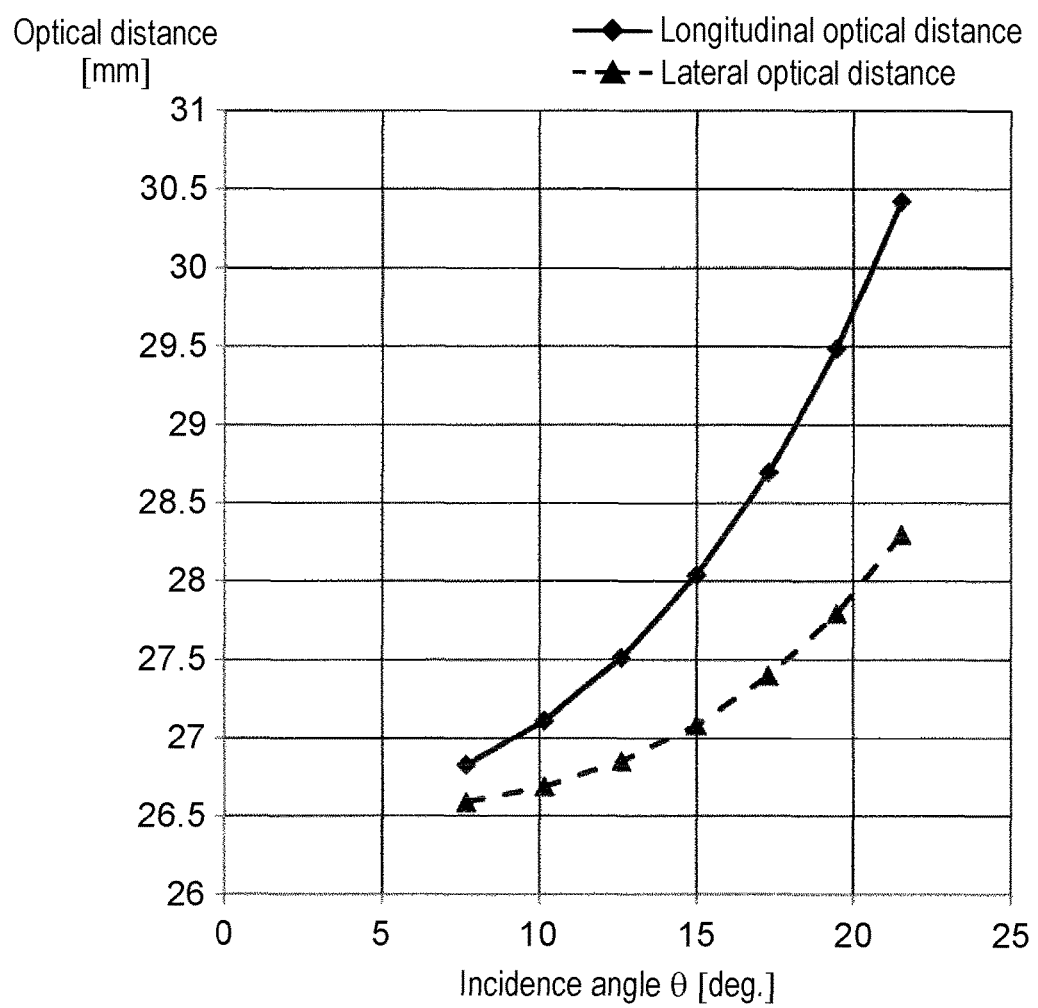
FIG. 7 is a graph illustrating the relationship between the incidence angle and the optical distance from a micro-display to a concave mirror in a display device according to the first exemplary embodiment.

FIG. 7 is a graph illustrating the relationship between incidence angle θ and the optical distance from micro-display 109 to concave mirror 110 in display device 10. FIG. 7 shows changes in the longitudinal and lateral optical distances between light emission point P1 on micro-display 109 and reflection points P2, P2′, and P2″ on concave mirror 110 when the reflection region is moved upon the diopter adjustment in display device 10 (refer to FIGS. 5 and 6).

The longitudinal optical distance is the length of the optical path between light emission point P1 and reflection points P2, P2′, and P2″ corresponding to the moving reflection region when projected on the yz plane (longitudinally oriented plane). The lateral optical distance is the length of each the optical paths between light emission point P1 and the abovementioned reflection points when projected on the xz plane (laterally oriented plane) resulting from rotation about the x-axis so as to pass through the abovementioned reflection points.

In the graph in FIG. 7, incidence angle θ on the abscissa is used as a parameter representing a reflection position (reflection points P2, P2′, and P2″) on reflective surface 110a of concave mirror 110 on which the reflection region moves. As described above, incidence angle θ decreases as the reflection position is located upward in the longitudinal direction (y-axis direction) on reflective surface 110a (refer to FIG. 5); incidence angle θ increases as the reflection position is located downward in the longitudinal direction (y-axis direction) on reflective surface 110a (refer to FIG. 6).

In FIG. 7, the longitudinal optical distance changes in such a way as to become shorter as incidence angle θ decreases and become longer as incidence angle θ increases. Specifically, when the reflection position is moved upward on reflective surface 110a, the reflection position is brought close to micro-display 109, and the longitudinal optical distance becomes short; when the reflection position is moved downward on reflective surface 110a, the reflection position is distanced from micro-display 109, and the longitudinal optical distance becomes long.

In FIG. 7, the lateral optical distance has a different value from the longitudinal optical distance for each incidence angle θ. The lateral optical distance changes in such a way as to become shorter as incidence angle θ decreases and become longer as incidence angle θ increases. Here, the rates of change in incidence angle θ, i.e., the rate of change of the longitudinal optical distance and the rate of change of the lateral optical distance for the movement of the reflection position are different from each other. Since the reflection position is moved in the longitudinal direction, the rate of change of the longitudinal optical distance is greater than the rate of change of the lateral optical distance.

The longitudinal optical distance defines the imaging distance of virtual image 112 in the longitudinally oriented plane (yz plane) according to equation (3). Meanwhile, the imaging distance of virtual image 112 in the laterally oriented plane (e.g., xz plane) intersecting the longitudinally oriented plane is defined by applying the lateral optical distance to equation (3). Thus, the difference between the longitudinal optical distance and the lateral optical distance such as that described above causes astigmatism in which the imaging position of virtual image 112 is different between planes intersecting each other, resulting in a situation similar to astigmatism as a vision condition. If such aberration is excessive, clear visual recognition of a virtual image becomes difficult for user 102.

In order to solve such a difficulty, as a result of diligent examination, the inventor of the present invention conceived the idea of differentiating the radii of curvature (or focal lengths) of reflective surface 110a of concave mirror 110 in the longitudinal and lateral directions so as to absorb the difference between the above longitudinal and lateral optical distances. The function of reflective surface 110a of concave mirror 110 based on the above findings will be described below.

2-3. Function of Reflective Surface Based on Solid Figure

Figure 8:
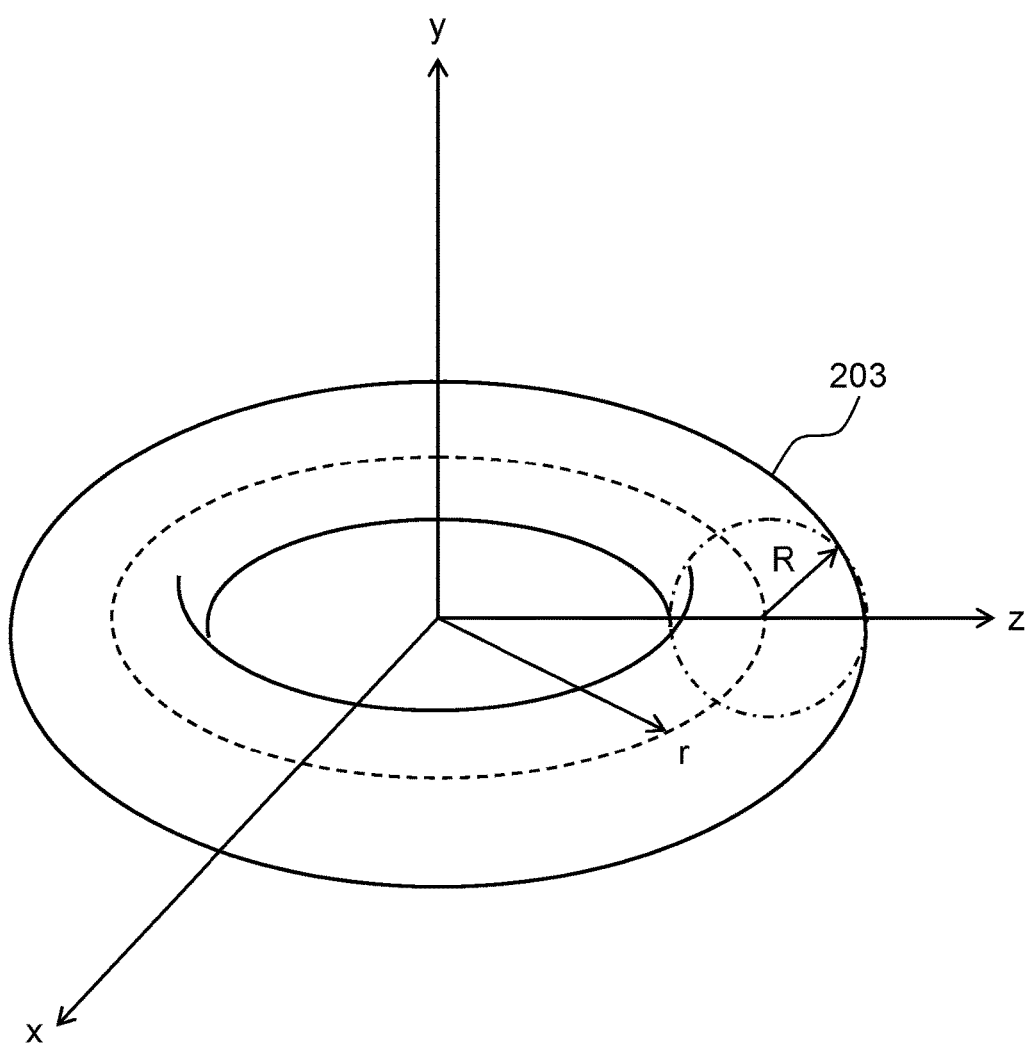
FIG. 8 is a perspective view illustrating an example of a solid figure having different radii of curvature in longitudinal and lateral directions.

In the present exemplary embodiment, the shape of reflective surface 110a of concave mirror 110 is set on the basis of a solid figure having different radii of curvature in the longitudinal and lateral directions. FIG. 8 illustrates an example of the solid figure having different radii of curvature in longitudinal and lateral directions.

Toric figure 203 (torus) exemplified in FIG. 8 is a solid figure having what is called a donut shape. Toric figure 203 can be represented by equation (4) below as a set of planes in a trajectory of a sphere having radius R moving along a circle having radius r in the xz plane.

$$\{(x^2+z^2)^{1/2}-r\}^2+y^2=R^2 \quad (4)$$

According to the above equation (4), toric figure 203 has two different radii of curvature (r+R) and R in the xz and yz planes. A reflective surface having radius of curvature (r+R) in the longitudinal direction and radius of curvature R in the lateral direction can be set on the basis of such toric figure 203. Note that although the example shown in FIG. 8 and equation (4) describes drawing a circle having radius r in the xz plane, the same or similar effects are produced also when the circle having radius r is drawn in the xy or yz plane.

Using a reflective surface based on toric figure 203 (refer to FIG. 8) represented by equation (4), proper selection of parameters R and r allows matching of focal lengths in the longitudinal and lateral directions according to the longitudinal and lateral optical distances, for example, for incidence angle θ as a reference for designing (refer to FIG. 2). Thus, it is possible to obtain a virtual image without astigmatism for specific incidence angle θ. Note that although FIG. 8 illustrates the example of r>R, parameters R and r may be selected, as appropriate, from a range not limited to r>R, upon setting of a reflective surface.

When the diopter adjustment is made during use of display device 10, the longitudinal and lateral optical distances change at different rates of change as described above (refer to FIG. 7). In this case, even when the reflection position moves according to the diopter adjustment, each of the radii of curvature (r+R) and R in the longitudinal and lateral directions is constant on the reflective surface represented by equation (4). Therefore, when the reflective surface represented by equation (4) is used as the reflective surface of the concave mirror, the reflection position moves from the standard position during the diopter adjustment, and thus it is difficult to avoid the occurrence of astigmatism.

Thus, in the present exemplary embodiment, the shape of reflective surface 110a is set on the basis of ellipsoid 201 (refer to FIGS. 3 and 4) so that the astigmatism occurring during movement of the reflection position is suppressed. The function of reflective surface 110a based on ellipsoid 201 will be described with reference to FIG. 9.

Figure 9:
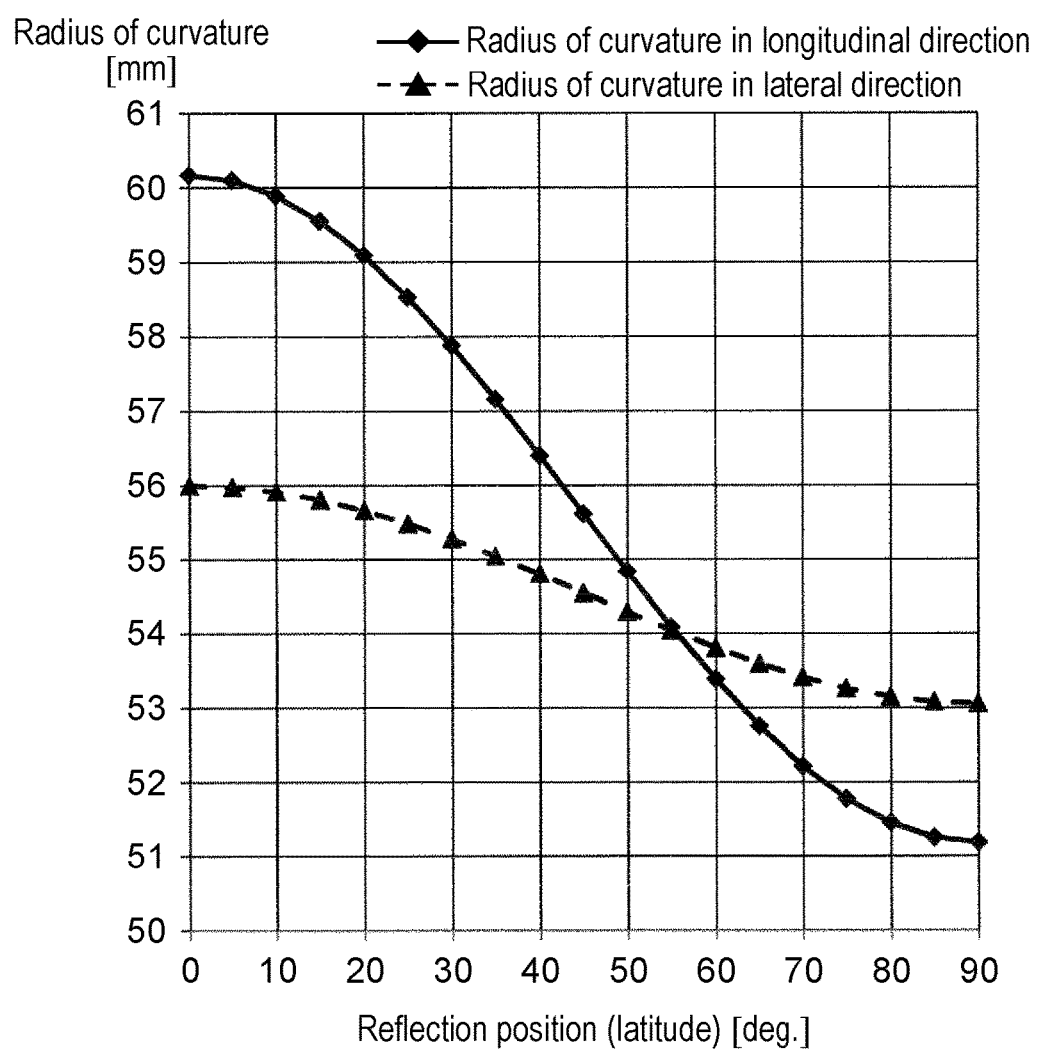
FIG. 9 is a graph illustrating the relationship between the reflection position on a reflective surface of a concave mirror and the radius of curvature thereof according to the first exemplary embodiment.

FIG. 9 is a graph illustrating the relationship between the reflection position on reflective surface 110a of a concave mirror 110 based on ellipsoid 201 and the radius of curvature thereof. The graph in FIG. 9 uses the latitude on ellipsoid 201 (refer to FIG. 4A) to represent the reflection position on reflective surface 110a.

In FIG. 9, the radius of curvature in the longitudinal direction changes in such a way as to become smaller as the latitude on ellipsoid 201 increases and become larger as the latitude decreases. A latitude increase on ellipsoid 201 corresponds to upward movement of the reflection position on reflective surface 110a; a latitude decrease on ellipsoid 201 corresponds to downward movement of the reflection position on reflective surface 110a. Thus, with reference to FIGS. 7 and 9, when the reflection position is moved upward on reflective surface 110a, the longitudinal optical distance decreases and the radius of curvature in the longitudinal direction also decreases; when the reflection position is moved downward on reflective surface 110a, the longitudinal optical distance increases and the radius of curvature in the longitudinal direction also increases.

In FIG. 9, the radius of curvature in the lateral direction has a different value from the radius of curvature in the longitudinal direction for latitude. The radius of curvature in the lateral direction changes in such a way as to become smaller as the latitude increases and become larger as the latitude decreases along with the change in the radius of curvature in the longitudinal direction. Here, the change along the latitude, that is, the rate of change of the radius of curvature in the longitudinal direction with respect to the movement of the reflection position is greater than the rate of change of the radius of curvature in the lateral direction with respect to the movement of the reflection position. In other words, the rate of change of the radius of curvature in the longitudinal direction and the rate of change of the radius of curvature in the lateral direction are different from each other as with the rates of change in the longitudinal and lateral optical distances (refer to FIG. 7).

In equation (3) that defines the imaging distance of virtual image 112, each of the longitudinal and lateral optical distances is applied to first optical distance A, and each of the radii of curvature in the longitudinal and lateral directions is applied to focal length F. Therefore, reflective surface 110a based on ellipsoid 201 absorbs a difference between the longitudinal and lateral optical distances by the above difference between the radii of curvature in the longitudinal and lateral directions, allowing a reduction in the difference in imaging distance (second optical distance B) of virtual image 112 between the yz plane and the xz plane, for example. Thus, the astigmatism in virtual image 112 can be reduced to make virtual image 112 easier to view when the reflection position is moved up and down upon the diopter adjustment of display device 10.

When the above-described incidence angle θ as a reference for designing is set as angle θ representing coefficient "a" for ellipsoid 201 in equation (2), the difference in imaging distance (second optical distance B) of virtual image 112 can be reduced with accuracy especially near the standard reflection position (refer to (a) in FIG. 5). Moreover, when angle θ defining extracted region 202 on ellipsoid 201 and incidence angle θ as a reference for designing are set to correspond to each other, the astigmatism near the standard reflection position can be further suppressed.

3. Advantageous Effects, etc.

As described above, display device 10 according to the present disclosure displays video for allowing virtual image 112 to be visually recognized. Display device 10 includes micro-display 109, concave mirror 110, and support mechanism 100. Micro-display 109 generates image light representing the video. Concave mirror 110 has reflective surface 110a on which the image light incoming from micro-display 109 is reflected. Support mechanism 100 supports micro-display 109 and concave mirror 110 in a manner as to adjust the position of concave mirror 110 in the first direction (y-axis direction) intersecting the direction of the normal to reflective surface 110a. Concave mirror 110 has, in each position on reflective surface 110a, a first radius of curvature in the first direction and a second radius of curvature in the second direction (x-axis direction) orthogonal to the first direction. The first radius of curvature and the second radius of curvature individually change according to the position on reflective surface 110a in the first direction and have different rates of change (refer to FIG. 9).

In display device 10 described above, when the position on reflective surface 110a is moved in the first direction (y-axis direction) to adjust the imaging distance of virtual image 112, the first and second radii of curvature change at different rates of change. Therefore, the astigmatism occurring during the adjustment of the imaging distance of virtual image 112 is reduced, and thus it is possible to facilitate the adjustment of the distance at which virtual image 112 can be visually recognized.

In the present exemplary embodiment, the first radius of curvature and the second radius of curvature increase as the position on reflective surface 110a is farther away from micro-display 109 in the first direction (y-axis direction). The rate of change of the first radius of curvature is greater than the rate of change of the second radius of curvature (refer to FIG. 9).

Therefore, the difference between the longitudinal optical distance and the lateral optical distance which change as the position on reflective surface 110a is distanced from micro-display 109 in the first direction (y-axis direction) during the adjustment of the imaging distance of virtual image 112 can be absorbed by the radii of curvature in the longitudinal and lateral directions. Thus, the astigmatism is further suppressed, and the diopter adjustment for virtual image 112 can be made with accuracy.

Furthermore, in the present exemplary embodiment, reflective surface 110a of concave mirror 110 has a shape following extracted region 202 which is a partial region on the outer surface of ellipsoid 201. Ellipsoid 201 has a radius along the first direction (y-axis direction) that is greater than a radius along the second direction (x-axis direction) and a radius along the third direction (z-axis direction) orthogonal to the first direction and the second direction.

Thus, reflective surface 110a of concave mirror 110 having the first and second radii of curvature that change at different rates of change is formed in accordance with the shape of ellipsoid 201, making it possible to easily provide virtual image 112 that is easy to view even when the diopter adjustment is made.

Furthermore, in the present exemplary embodiment, when the first direction is the y-coordinate axis, the second direction is the x-coordinate axis, and the third direction is the z-coordinate axis, ellipsoid 201 is defined by equation (1) using coefficient "a" which is a parameter between 0 and 1, coefficient "b" which is a parameter between 1 and 1/a, inclusive, and radius R which is a parameter greater than 0.

Thus, on the quadric surface represented by equation (1), reflective surface 110a of concave mirror 110 can be easily set according to respective parameters which are coefficient "a", coefficient "b" and radius R. Accordingly, with a simple structure, it is possible to easily implement what is called a diopter adjustment function that allows adjustment of the imaging distance of a virtual image in accordance with the environment in which display device 10 is used, the user's eyesight, and the like.

Furthermore, in the present exemplary embodiment, the incidence angle of the image light incident on concave mirror 110 from micro-display 109 includes angle θ that satisfies the relationship in equation (2) for parameter "a". Furthermore, in the present exemplary embodiment, a region located on ellipsoid 201 and corresponding to reflective surface 110a of concave mirror 110 is defined by the above angle θ. Thus, the occurrence of astigmatism for virtual image 112 near incidence angle θ that satisfies the relationship in equation (2) can be reduced in a better way.

Furthermore, in the present exemplary embodiment, support mechanism 100 adjusts at least one of the position and the orientation of concave mirror 110 in the first direction (y-axis direction) while maintaining the positional relationship between micro-display 109 and concave mirror 110. Thus, it is possible to easily make the diopter adjustment for virtual image 112 by changing the position of concave mirror 110 in the first direction while maintaining the preset positional relationship between micro-display 109 and concave mirror 110.

Furthermore, in the present exemplary embodiment, support mechanism 100 adjusts at least one of the position and the orientation of concave mirror 110 by rotating concave mirror 110 about the second direction (x-axis direction) as a rotation axis using first and second pivots 104 and 105. Thus, by rotation of concave mirror 110, the position of concave mirror 110 can be easily changed in the first direction (y-axis direction) for the purpose of diopter adjustment for virtual image 112.

Furthermore, in display device 10 according to the present exemplary embodiment, the image light is reflected only on reflective surface 110a of concave mirror 110. Thus, display device 10 having the diopter adjustment function can be provided using a simple optical system. Note that display device 10 according to the present exemplary embodiment may be provided, being built into a device including a more complex optical system.

Furthermore, in the present exemplary embodiment, support mechanism 100 is worn on the head of user 102 by head band 101. Thus, display device 10 can be provided as a head-mounted display (HMD). Note that display device 10 may be formed separately from a member for fitting onto the head such as head band 101.

Other Exemplary Embodiments

As described above, the first exemplary embodiment is presented as an exemplification of the techniques disclosed in the present application. However, the techniques of the present disclosure are not limited thereto; the techniques are also applicable to exemplary embodiments to which a modification, substitution, addition, omission, etc., is executed as necessary. Furthermore, a new exemplary embodiment can be formed by combining the respective structural elements described in the above exemplary embodiment. In view of this, other exemplary embodiments will be exemplified below.

Although reflective surface 110a of concave mirror 110 is represented by equation (1) in the first exemplary embodiment, the mathematical expression may be modified, as appropriate, within the range in which identity or equivalence can be maintained. For example, the square roots may be expanded in series, and small coefficients in the resultant infinite series may be omitted from a mathematical expression to be used.

Furthermore, although reflective surface 110a of concave mirror 110 is set by extracting extracted region 202 from ellipsoid 201 in the first exemplary embodiment, the reflective surface of the concave mirror according to the present disclosure is not limited to this example. For example, a region corresponding to the reflective surface of the concave mirror may be extracted from a curved surface that locally matches a part of the outer surface of ellipsoid 201. The reflective surface of the concave mirror may include not only a part matching a part of a specific curved surface, but also another part.

The first exemplary embodiment has described, as an example of the video generation unit according to the present disclosure, micro-display 109 of a transmissive liquid-crystal device including backlight 107 and liquid-crystal panel 108. The video generation unit according to the present disclosure is not limited to this example, and may be, for example, a micro-display included in a reflective liquid-crystal device or an organic electroluminescent device or may be a micro-LED display including an LED array.

The first exemplary embodiment has described an example in which head band 101 of display device 10 is directly fitted onto the head of user 102. The method of fitting head band 101 is not limited to this example, and when user 102 uses a hat/cap or a helmet, for example, head band 101 may be fitted onto the hat/cap or the helmet. This is not limited to head band 101; for example, display device 10 may be configured to be fixed to the hat/cap or the like. Support mechanism 100 of display device 10 may be configured to include a glasses frame, a hat/cap, a helmet, and the like.

Furthermore, although the first exemplary embodiment has described an example in which micro-display 109 is disposed above pupil 111 of user 102, the position of micro-display 109 is not limited to this example. Micro-display 109 may be vertically inverted so as to be located below pupil 111 of user 102 or may be positioned at the side of pupil 111.

The first exemplary embodiment has described support mechanism 100 including a link mechanism based on first pivot 104, second pivot 105, and arm 103. In support mechanism 100, the number of links in the link mechanism may be increased when necessary, and each link may include a rotary shaft at one or both ends. Furthermore, the support mechanism according to the present disclosure may include a direct-drive sliding mechanism.

As described above, the exemplary embodiments are presented as exemplifications of the techniques of the present disclosure. To this extent, the accompanying drawings and detailed description are provided.

Thus, the structural elements set forth in the accompanying drawings and detailed description include not only structural elements essential to solve the problems but also structural elements unnecessary to solve the problems for the purpose of illustrating the above techniques. Thus, those unnecessary structural elements should not be deemed essential due to the mere fact that they appear in the accompanying drawings and the detailed description.

The above-described exemplary embodiments illustrate the techniques of the present disclosure, and thus various modifications, substitutions, additions, omissions, etc., are possible in the scope of the appended claims and the equivalents thereof.

INDUSTRIAL APPLICABILITY

The present disclosure can be applied to a head-mounted display device which is used, for example, in a situation where video information including an image and moving images such as drawings and lists needs to be referred to without users' hands being occupied on the move.

What is claimed is:

1. A display device which displays video for allowing a virtual image to be visually recognized, the display device comprising:
    a video generation unit that generates image light representing the video;
    a concave mirror having a reflective surface on which the image light incoming from the video generation unit is reflected; and
    a support mechanism that supports the video generation unit and the concave mirror in a manner as to adjust a position of the concave mirror in a first direction intersecting a direction of a normal to the reflective surface, wherein
    the concave mirror has, in each position on the reflective surface, a first radius of curvature in the first direction and a second radius of curvature in a second direction orthogonal to the first direction,
    the first radius of curvature and the second radius of curvature individually change according to a position on the reflective surface in the first direction and have different rates of change,
    the reflective surface of the concave mirror has a shape following a partial region on an outer surface of an ellipsoid, and
    the ellipsoid has a radius along the first direction that is greater than a radius along the second direction and a radius along a third direction orthogonal to the first direction and the second direction.

2. The display device according to claim 1, wherein
the first radius of curvature and the second radius of curvature increase as the position on the reflective surface is farther away from the video generation unit in the first direction, and
the rate of change of the first radius of curvature is greater than the rate of change of the second radius of curvature.

3. The display device according to claim 1, wherein
when the first direction is a y-coordinate axis, the second direction is an x-coordinate axis, and the third direction is a z-coordinate axis, the ellipsoid is defined by equation (1):

$$x^2+ay^2+bz^2=R^2 \qquad (1)$$

wherein parameter "a" is between 0 and 1, parameter "b" is between 1 and 1/a, inclusive, and parameter "R" is greater than 0.

4. The display device according to claim 3, wherein
an incidence angle of the image light incident on the concave mirror from the video generation unit includes angle θ that satisfies relationship in equation (2) for the parameter "a":

$$a=1-(\sin\theta)^2/\cos\theta \qquad (2).$$

5. The display device according to claim 4, wherein
a region located on the ellipsoid and corresponding to the reflective surface of the concave mirror is defined by the angle θ.

6. The display device according to claim 1, wherein
the support mechanism adjusts at least one of the position and an orientation of the concave mirror in the first direction while maintaining positional relationship between the video generation unit and the concave mirror.

7. The display device according to claim 6, wherein
the support mechanism adjusts at least one of the position and the orientation of the concave mirror by rotating the concave mirror about the second direction as a rotation axis.

8. The display device according to claim 1, wherein
the image light is reflected only on the reflective surface of the concave mirror.

9. The display device according to claim 1, wherein
the support mechanism is worn on a user's head.

* * * * *